INVENTORS
RUDOLPH L. ALLISON
WILLY J. GOELLNER

BY  Burns, Doane, Benedict,
    Swecker & Mathis
                ATTORNEYS

United States Patent Office 3,572,200
Patented Mar. 23, 1971

3,572,200
METHOD AND APPARATUS FOR SPREADING
SEVERED PORTIONS OF A WORKPIECE
Rudolph L. Allison and Willy J. Goellner, Rockford, Ill.,
assignors to Paramount Textile Machinery Co.
Filed July 1, 1969, Ser. No. 838,220
Int. Cl. B26d 7/06, 7/02
U.S. Cl. 83—27                                    4 Claims

ABSTRACT OF THE DISCLOSURE

A method and apparatus for severing a workpiece with a cutting tool returnable through the kerf or cut made thereby characterized by the movement of the severed portions away from the kerf prior to the return of the cutting tool. At least one of the severed portions is subsequently restored to its initial position to facilitate measuring. When slides are employed for separating the severed portions of the workpiece, the severed workpiece portions may be clamped to these slides from two generally opposite directions.

BACKGROUND OF THE INVENTION

This invention relates to cutting operations involving the return movement of a cutting tool through the kerf or cut made thereby. More particularly, this invention relates to a cutting apparatus and method wherein the severed portions of a workpiece are separated prior to return movement of the cutting tool.

Subsequent to the severance of a workpiece by a rotating or reciprocating cutter, it has been common for many years to return the cutting tool through the kerf or cut produced by the severance. Usually, the cutting tool is continuously driven during this return movement in order to avoid the need for restarting the machine prior to each cut.

Upon passage of the cutting tool through the kerf, the tool normally engages one or both of the severed portions of the workpiece. This engagement may result from the tendency of the workpiece to expand into the kerf in order to relieve compressive stresses induced by the cutting tool on the workpiece faces exposed by cutting, or from the actual shifting of the severed portions toward one another as a consequence of vibrations produced during the cutting operation.

At any rate, the cutting tool and workpiece interaction not only produces a significant amount of undesirable noise during the return stroke of the cutter, but also tends to mar the finish of the workpiece surfaces adjacent the kerf.

Moreover, the contact between the tool and the workpiece may significantly reduce the useful life of the tool.

In the past, many saw blades were constructed from high-speed steel, high-carbon steel, or abrasive material, all of which were relatively unaffected by the reverse rubbing action that occurs when the blade is retracted through a cut. However, with the advent of the relatively new sawblade technology, involving carbide tips brazed onto the body of the saw blade, the reverse rubbing in a direction opposite to that of the cutting force may have a tendency to cause chipping of the corners of the carbide tips or breaking of the tips at the braze line.

OBJECTS AND SUMMARY OF THE INVENTION

It is therefore a general object of the invention to provide a method and apparatus that eliminates problems of the sort previously noted.

It is a particular object of the invention to provide a method and apparatus which eliminates interaction between a cutting tool and a workpiece during return movement of the cutting tool.

It is a related object of the invention to provide such a method and apparatus characterized by the movement of the severed workpieces away from the kerf, and the return of at least one of the severed portions to its initial position in order to facilitate measuring operations.

It is another object of the invention to provide such a method and apparatus wherein the severed work portions are positively clamped from generally opposite sides prior to the occurrence of separating movement.

It is still another object of the invention to provide an improved method and apparatus for cutting a workpiece with a cutting tool returnable through the kerf.

A preferred embodiment of the invention intended to accomplish at least some of the foregoing objects involves a rotatable carbide tip saw blade translatable toward and away from a workpiece supported generally transversely to the direction of translation of the saw blade.

The support for the workpiece includes two slides on each of which a releasable clamp is mounted. Prior to the return of the saw blade through the kerf, releasable clamps are operated to maintain the severed workpiece tightly against the slides by a clamping force applied in a first direction.

Also, the ways on which the slides are mounted are forced into tight engagement with the slides so as to clamp the workpiece against the slides from a generally opposite direction.

A piston and cylinder assembly is then activated to separate the slides by a predetermined amount, with each slide being moved away from the kerf. Subsequent to the return of the saw blade to its original position, the slides, and therefore the severed portions of the workpiece are returned to their initial positions in order to facilitate the taking of measurements.

THE DRAWINGS

Other objects and advantages of the present invention will become apparent from the following detailed description of a preferred embodiment of the invention as illustrated in the accompanying drawings in which:

FIG. 4 is an inverted perspective view of the stop means shown in FIG. 3.

DETAILED DESCRIPTION

General summary

Figure 1:
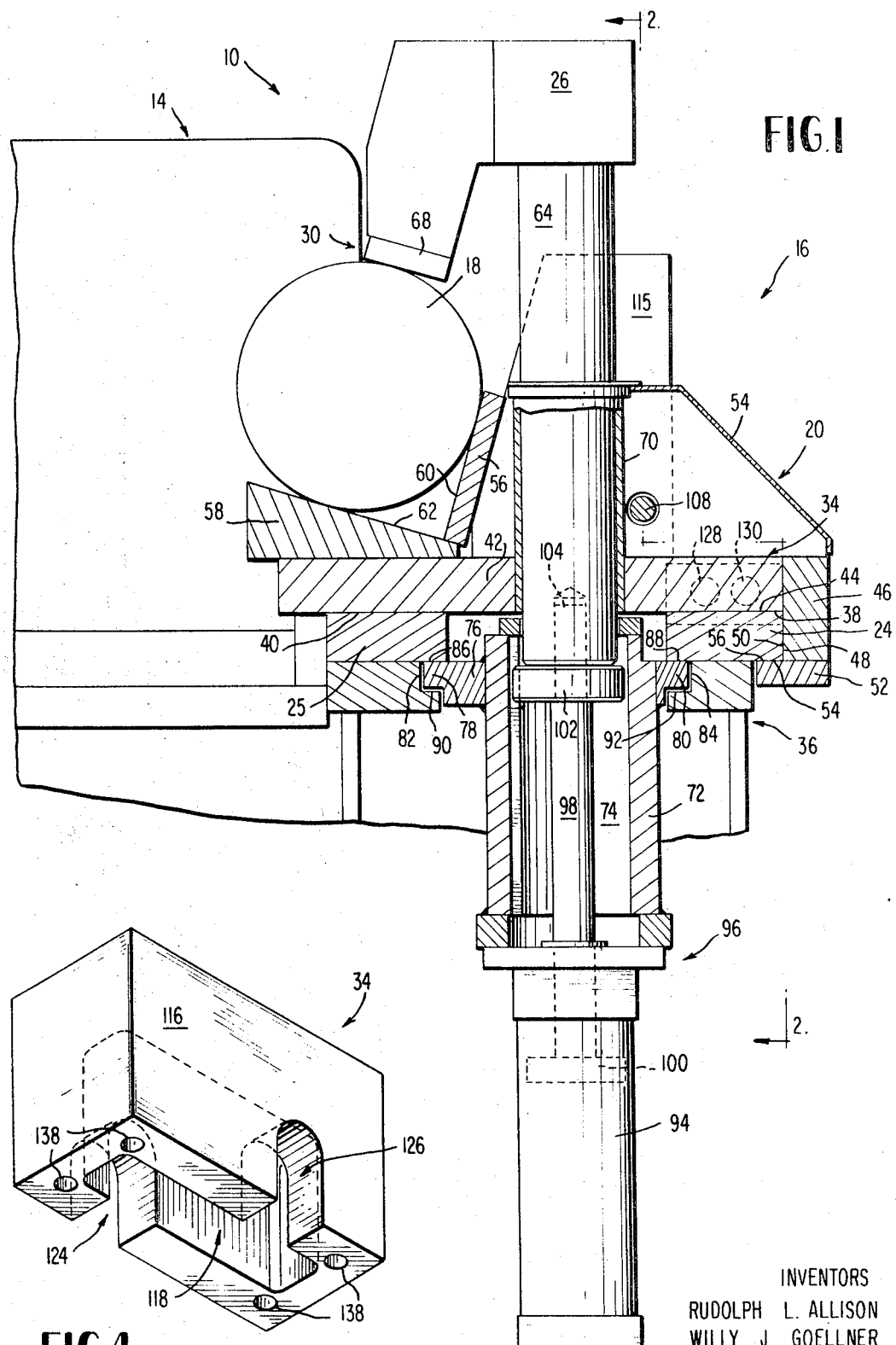
FIG. 1 is a partially cross-sectional, side elevational view of a cutting machine according to the present invention.
Figure 2:
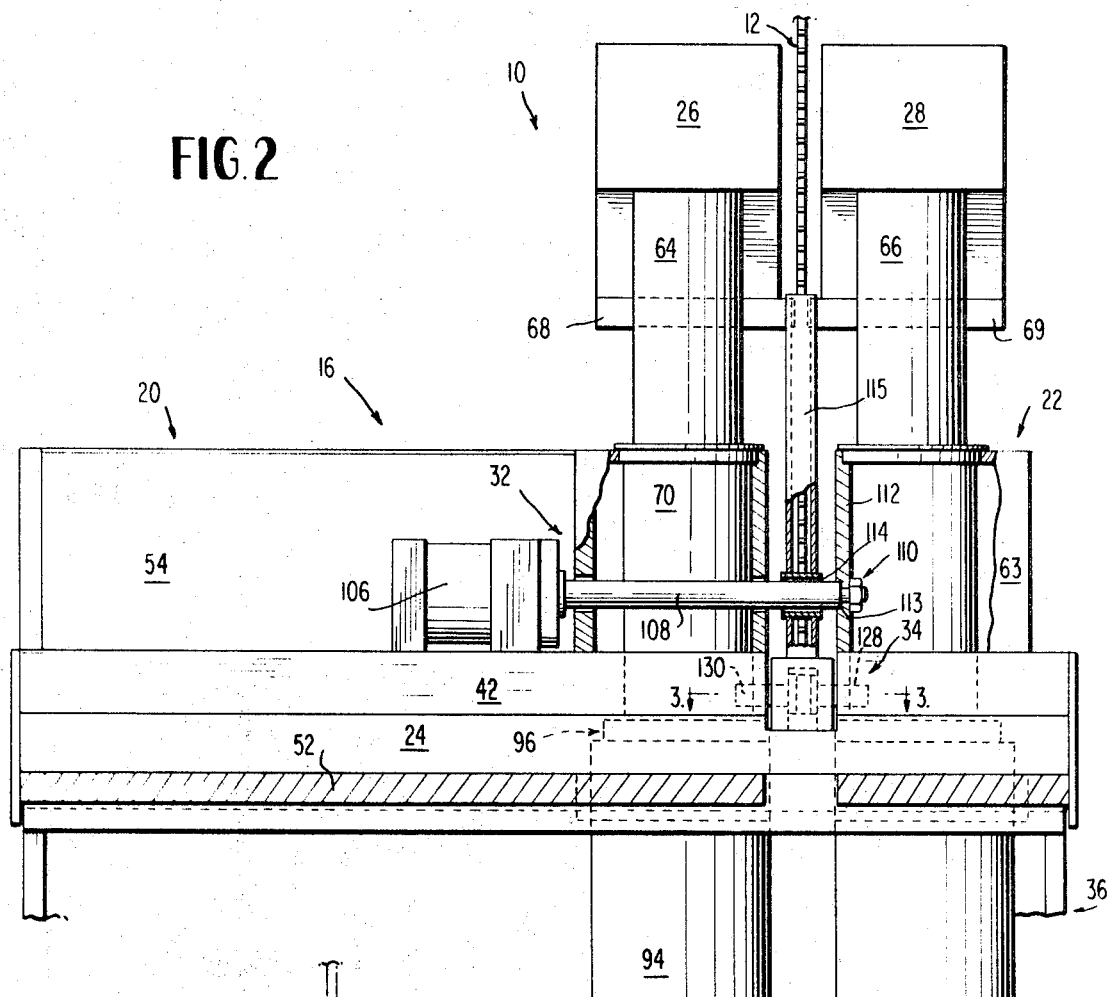
FIG. 2 is a partially cross-sectional, end elevational view taken along line 2—2 in FIG. 1.

Referring now to FIGS. 1 and 2, a cutting machine 10 according to a preferred embodiment of the present invention is there shown.

The cutting machine 10 includes a rotatable carbide tip saw blade 12 (FIG. 2) mounted for reciprocating movement on a slidable base 14. Any suitable motor means (not shown) may be employed to provide the translating and rotating movement of the saw blade 12.

Disposed generally transversely of the path of translation of the saw blade 12 is a workpiece support assembly 16. This support assembly may include a roller-type support means (not shown) on which the major portion of a bar 18 of stock material rests. The end of this bar 18 is supported on each of two slides 20 and 22 (FIG. 2), with the slides being situated on opposite sides of the plane of translation of the saw blade 12. Each slide is slidably mounted on spaced ways 24 and 25.

Extending upwardly from each of the slides 20 and 22 are first and second vises 26 and 28. Subsequent to a cutting operation, the vises 26 and 28 may be lowered into engagement with the separated portions of the workpiece 18 as indicated at 30. If desired, the ways 24 and 25 may be forced tightly against the bottom portions of the slides 20 and 22 to insure positive clamping of the separated portions of workpiece against the slides, in a manner hereinafter more fully described.

Prior to the return of the saw blade 12 through the kerf and to its initial position, the slides 20 and 22, and therefore the severed work portions clamped thereto, are separated by operation of a piston and cylinder assembly 32 (FIG. 2). After the saw blade has been returned through the kerf, the slides and the severed portions of the workpiece are returned to their initial positions by reversing the operation of the piston and cylinder assembly 32. A stop member 34 (FIGS. 3 and 4) is provided between the slide members 20 and 22 to limit the movement of the slide members in both directions.

Detailed structure and method of operation

Referring again to FIGS. 1 and 2, it will be seen that the workpiece support assembly 16 includes a stationary base member 36 in addition to the slide members 20 and 22 and ways 24 and 25. The ways 24 and 25 are mounted on this base member and supported in a generally horizontal position to present flat, upper guide surfaces 38 and 40. For a purpose hereinafter more fully described, the ways 24 and 25 are bolted or otherwise secured to the stationary base member 36.

The slide 20 is supported for movement on the ways by means of a first reciprocable member 42. This reciprocable member 42 is provided with a flat bottom surface 44 which rests on the upper way surfaces 38 and 40 and is slidable relative thereto.

Fixed to the first reciprocable member 42, at the end thereof remote from the slidable base 14 on which the saw blade 12 is mounted, is a second reciprocable member 46. This second reciprocable member presents a generally vertically extending, flat, slidably surface 48 which slides along a similarly oriented surface 50 of the way 24 remote from the saw 12. A third reciprocable member 52 is fixed to the second reciprocable member 46 and presents an upper slide surface 54 that slidably engages a portion of the lower surface 56 of the way 24 which projects outwardly beyond the stationary base member 36. Thus, the reciprocable members 42, 46 and 52 define a channel in which the way 24 is received for relative slidable movement. It will be apparent that the second slide 22 is provided with similar reciprocable members oriented to define a substantially identical way receiving channel, with this latter channel having a lesser longitudinal extent along the way 24 than that of the channel of the first slide member 20.

The upper portion of the slide member 20 includes a hollow housing 54 that is generally trapezoidal in cross-section. This housing is fixed to the first and second reciprocable members 42 and 46 for movement therewith. Along the surface of the housing 54 facing the saw blade 12 a generally upwardly extending member 56 of a workpiece support shelf is attached in any suitable manner. A generally laterally extending member 58 of this support shelf is fixed to the first reciprocable member 42. These members 56 and 58 of the support shelf respectively present vertically and horizontally inclined and contiguous surfaces 60 and 62 offset by substantially a right angle. The end portion of the workpiece 18 which is to be severed during a cutting operation is supported by these surfaces 60 and 62.

It will be appreciated that the second slide member 22 includes a hollow housing 64 and support shelf (not shown) substantially identical to the corresponding portions of the first slide member 20 but having a lesser longitudinal extent along the workpiece 18.

Extending upwardly through each of the slides 20 and 22 adjacent the juxtaposed ends thereof are first and second rods 64 and 66. These rods are respectively attached, at their upper ends, to the previously identified vises 26 and 28 which are disposed so as to present clamping surfaces 68 and 69 over the workpiece support surfaces.

The rod 64 is slidably received within a cylinder 70 extending through the hollow slide housing 54 and the upper reciprocable base member 42. Positioned below the cylinder 70 and between the ways 24 and 25, is a hollow, floating sleeve 72 having an internal chamber 74 substantially concentric with the cylinder 70.

This sleeve 72 is provided with an external collar 76 having longitudinally extending flanges 78 and 80 on opposite sides thereof. The flanges 78 and 80 are received in channels 82 and 84. These channels 82 and 84 are defined by oppositely facing and generally L-shaped cutouts in the upper portion of the stationary base 36 of the workpiece support assembly 16 together with the downwardly facing surfaces 86 and 88 of the ways 24 and 25, which downwardly facing surfaces project inwardly of the base 36 toward one another.

As indicated at 90 and 92, the thickness of the flanges 78 and 80 is such that a degree of clearance exists to permit slight vertical movement of the flanges within the channels 82 and 84. Preferably, the amount of clearance is on the order of 1/32 of an inch. However, for purposes of illustration, the clearance is exaggerated in FIG. 1.

Suspended from the floating sleeve 72 is a hydraulic cylinder 94. This cylinder is generally coaxial with the sleeve 72 and is fixed at its upper end 96, to the floating sleeve for movement therewith, thereby to render the cylinder of a floating nature.

A piston rod 98 extends into the chamber 74 of the sleeve and into the hydraulic cylinder 94 where it is attached to a piston 100. At the sleeve end the piston rod 98 is connected to a slidable piston-like member 102 having a diameter substantially equal to that of the sleeve chamber 74. This member 102 is fixed to the lower end of the vise connecting rod 64 by any suitable means such as a threaded bolt 104.

Subsequently to severance of the workpiece 18 and prior to separation of the slides 20 and 22, fluid under pressure is supplied to the upper end of the cylinder 94 from any suitable source (not shown). This causes downward movement of the piston 100 which ultimately moves the clamping surface 68 of the vise 26 into engagement with the workpiece. At this point, the reaction force to the fluid pressure acting on the piston 100 causes upward movement of the floating cylinder 94 and floating sleeve 72 (permitted by the clearances 90 and 92 in the channels 82 and 84).

Thus, as a result of the movement of the floating cylinder 94 and floating sleeve 72, a second positive clamping force is provided between the workpiece 18 and the slide member 20, which force acts in a direction generally opposite to that of the force provided by the vise 26. Additionally, this force insures positive engagement between the slidable surface 44 of the first reciprocable member 42 and the upper surfaces 38 and 40 of the ways.

It will be apparent that the second slide member 22 is provided with an arrangement to exert clamping forces in a manner identical with that described in connection with the first slide 20.

After the severed portions of the workpiece are clamped to the slides 20 and 22 and before the saw blade 12 is returned through the kerf of the cut, the slides 20 and 22 and, therefore, the supported workpiece portions are separated by the previously identified piston and cylinder assembly 32.

This piston and cylinder assembly includes a hydraulic cylinder 106 (FIG. 2) fixedly mounted in any convenient manner, in one of the hollow housings 54 of one slide member 20 on the upper reciprocable member 42. Extending outwardly from this housing 54, behind the cylinder 70 which receives the vise connecting rod 64, is a piston rod 108. This rod 108 is bolted, as shown at 110, or otherwise secured to the internal portion of the end wall 112 of the other hollow housing 64, which wall 112 faces the first hollow housing 54. The rod 108 is additionally provided with a shoulder 113 which bears against a pocket in the outer surface of the end wall 112 to which it is secured.

Between the slides 20 and 22 the rod extends through registered apertures 114 in a U-shaped shield 115 which opens toward the saw blade 12.

When fluid pressure is applied from any suitable source (not shown) to the cylinder 106 to tend to telescope the piston 108 outwardly thereof, the slides tend to move away from one another along the ways 24 and 25. The previously identified stop member 34 is disposed on the way 24 remote from the saw blade 12 and between the slides 20 and 22.

Figure 3:
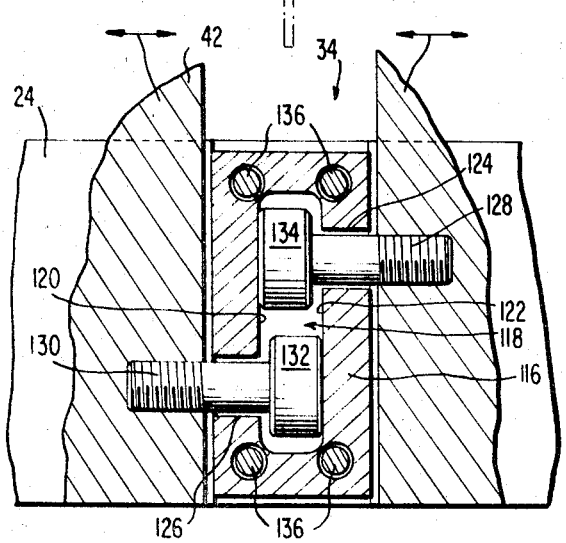
FIG. 3 is a partially cross-sectional, top plan view of the stop means taken along line 3—3 of FIG. 1.

Referring now to FIGS. 3 and 4, it will be seen that this stop member 34 comprises a block 116 having a vertically extending slot 118 within. The opposite side walls 120 and 122 defining the slot 118 provide abutments for limiting the movement of the slides 20 and 22. On each side of the block is a transverse, generally U-shaped access opening 124 and 126 communicating with the slot 118. These access openings 124 and 126 are laterally offset from one another.

The threaded shanks 128 and 130 of the first and second screws are attached respectively to the upper slidable support members 42 of the slides 20 and 22 and project into the access openings 124 and 126. The screws are provided with enlarged flat heads 132 and 134 which alternately abut the opposite walls 120 and 122 of the slot 118 to prevent excessive movement of the slides in either direction.

It will be appreciated that upon retraction of the saw blade 12 through the kerf, the return movement of the slides caused by reverse pressurizing of the cylinder 106 of the piston and cylinder assembly 32 results in the abutment between the flat head 132 and 134 and the slot walls 120 and 122 so as to insure the return of the slides (and therefore the severed portions of the workpiece) to their initial positions. This facilitates the taking of accurate measurements prior to proceeding with the next cutting operation.

The block 116 is received within a pocket 137 in the way 24 and is securely fastened thereto by means of bolts 136 extending through longitudinal apertures 138 in the corners of the block so that repeated separating and return action of the slides 20 and 22 always results in proper positioning of the severed workpiece portions.

SUMMARY OF ADVANTAGES AND SCOPE OF THE INVENTION

It will be seen that following the present invention, an improved cutting apparatus and cutting method are provided so as to minimize problems associated with the return of a cutting tool through the kerf by separating the severed portions of the workpiece prior to that return.

Particularly significant is the use of stop means to insure the return of at least the uncut portion of the workpiece to its initial position, subsequent to return of the cutting means, in order to facilitate accurate measuring operations.

Also of importance is the use of a floating sleeve to minimize the possibility of movement of the workpiece relative to the slide members on which they are supported by providing positive clamping of the workpiece to the slide members with forces acting in generally opposite directions.

It will be appreciated that these advantages may be realized with apparatus other than that specifically described. For example, pneumatic rather than hydraulic cylinders, as well as any other suitable motor force, may be employed to provide the separating force for the slides and/or the clamping forces on the severed workpiece portions.

It will also be appreciated that, if desired, the slide associated with the severed end portion of the workpiece remote from the bulk of the remaining stock material may be dispensed with and replaced by any suitable conveyor means for removing this workpiece portion, insofar as measuring operations may not require return of this portion to its original position.

Moreover, clamp means or slide means of a type other than those specifically illustrated may be employed without departing form the spirit of the invention.

It is also to be noted that the method and apparatus of the present invention are applicable to cutting operations involving saw blades other than the carbide tip type, as well as to those cutting operations which involve translation of the workpiece toward the blade during cutting and/or those operations which employ reciprocating cutting tools rather than rotating cutting tools.

Therefore, it is apparent that although the invention has been described in connection with one preferred embodiment and method, additions, modifications, substitutions and deletions, such as those mentioned above, as well as others not specifically described, may be made therein without departing from the spirit of the invention.

What is claimed is:

1. In a machine for severing a workpiece by cutter means movable relative to and generally transversely of the workpiece to make a cut, and returnable relative to the workpiece through the path of the cut, the improvement comprising: spreader means for moving each of the severed portions of the workpiece in generally opposite directions away from one another prior to return of said cutter means, relative to the workpiece, through the path of the cut, and for returning said severed portions to their initial positions.

2. A cutting apparatus for sequentially severing the end portion of a workpiece from the remainder thereof, the apparatus comprising:
   support means for supporting the workpiece,
   cutter means, movable relative to the workpiece, for severing the workpiece into first and second portions, said cutter means being returnable, relative to the workpiece, through the cut made thereby,
   first means for moving said first severed portion of said workpiece away from said cut and from said second severed portion,
   second means for moving said second severed portion away from said cut and from said first severed portion, and
   means for returning at least said second severed portion to its initial position.

3. The method for sequentially severing the end portion of a workpiece from the remainder thereof with a cutter relatively translatable with respect to the workpiece, the method comprising:
   supporting the workpiece in a position generally transverse to the direction of relative translation of a cutter means,
   translating the cutter relative to the workpiece to sever the workpiece into first and second portions,
   spreading the severed portions of the workpiece,
   returning said cutter, relative to the workpiece, through the cut made thereby,
   returning at least one of the severed portions of the workpiece to its initial position.

4. In a method for severing a workpiece by cutter means movable relative to and generally transversely of the workpiece to make a cut, and returnable relative to the workpiece through the path of the cut made thereby, the improvement comprising:

moving each of the severed portions of the workpiece in generally opposite directions away from one another prior to the return of the cutter means, relative to the workpiece, through the cut made thereby, and returning each of the severed portions to its initial position.

References Cited

UNITED STATES PATENTS 2,064,017  12/1936  Leschen _____ 143—46X

JAMES M. MEISTER, Primary Examiner

U.S. Cl. X.R.

83—107, 113, 466